UNITED STATES PATENT OFFICE.

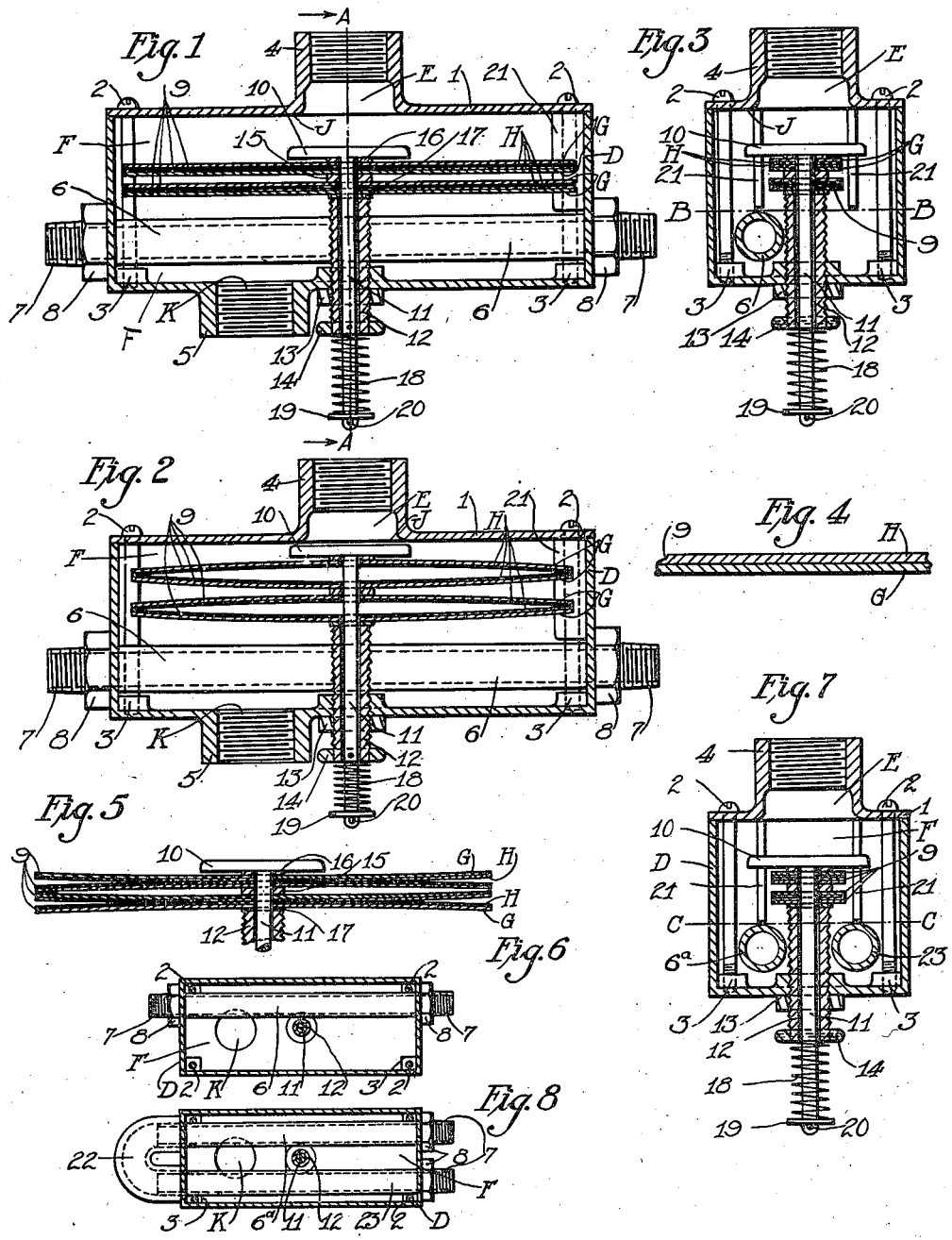

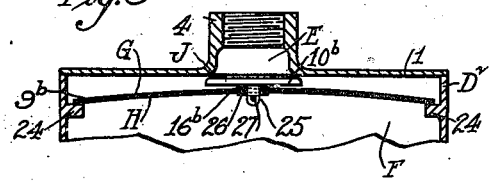
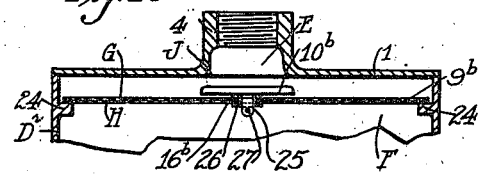
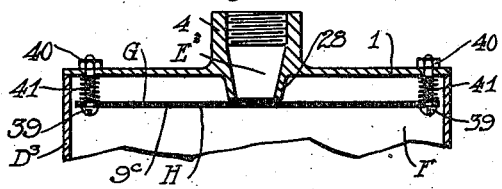
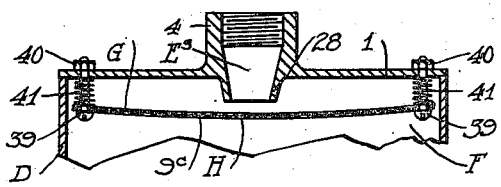
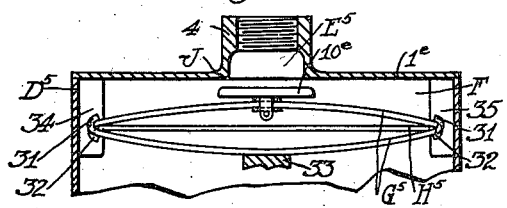
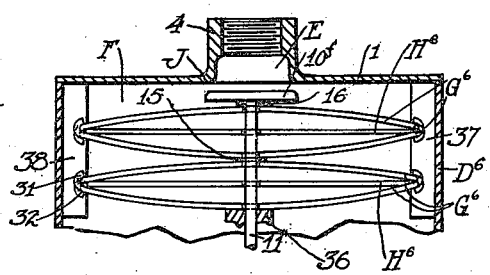

HENRY NEWTON WHITTELSEY, OF GREENWICH, CONNECTICUT, ASSIGNOR TO WHITTELSEY COMPANY, OF NEW YORK, N. Y., A CORPORATION OF NEW YORK.

LIQUID-FUEL HEATER.

1,219,515.  Specification of Letters Patent.  Patented Mar. 20, 1917.

Application filed September 14, 1914. Serial No. 861,554.

*To all whom it may concern:*

Be it known that I, HENRY NEWTON WHITTELSEY, a citizen of the United States, and a resident of Greenwich, county of Fairfield, State of Connecticut, have invented certain new and useful Improvements in Liquid-Fuel Heaters, of which the following is a specification, accompanied by drawings.

This invention relates to a device for preheating the liquid fuel supplied to the carbureting or vaporizing apparatus or cylinder direct of an internal combustion engine, and the device is particularly applicable for heating liquid fuels not readily vaporized at atmospheric temperatures or having a material portion of constituents not so vaporized, examples of such fuels being heavy gasolenes, kerosene, fuel oil, alcohol, etc., although the invention may have a general use in heating other liquids.

The primary object of the present invention is to enable the temperature of the liquid fuel to be raised above the atmospheric temperature, thereby materially increasing the vapor pressure of the fuel, and thus producing the beneficial result of increased vaporization when the fuel is released or discharged in the carbureter, vaporizer or engine cylinder space.

By so supplying heat to the liquid fuel, the temperature of the gaseous charge is not raised, thus avoiding rarefying the charge to the cylinders with consequent reduction of the power of the engine. Frequently the necessary heat is not fully applied to the fuel in carbureting apparatus, due to the small fraction of time for applying such heat, so that liquid globules often enter the engine cylinder.

Although heat to effect vaporization may have heretofore been added to the liquid fuel before its release or discharge in the carbureter, vaporizer or engine cylinders direct, full practical advantage has never been taken of this very advantageous method, owing to lack of proper apparatus, and probably owing to a lack of appreciation among those otherwise skilled in the art, of the material advantages obtainable from increase of the vapor pressures for effecting vaporization. Furthermore, the general assumption seems to have been, that the temperature of such complex hydrocarbon fuels as gasolene, kerosene and the like, which contain many constituents having different boiling points, may not be raised above the boiling points of the lightest constituents, and with such a limit placed on the heating of the fuel, the full vaporization effect possible cannot be obtained.

I have subjected a gasolene of 60° Baumé gage, now commonly sold on the market, to a temperature of 200° F. in a copper pipe, without generating a disadvantageous amount of gas from the lightest constituents, although one of those constituents may boil as low as 60° F. Moreover, in actual running conditions on the road with a gasolene motor vehicle, I have successfully heated the fuel to about such a temperature and obtained satisfactory operation. It is not necessary, however, to heat to the top limits in order to materially increase the vapor pressures, and effect material vaporization. I have found that 125° F. to 150° F. for a 60° Baumé gage gasolene gives very good results, and for a 44° Baumé gage kerosene a temperature of 300° is satisfactory.

The advantageous use of so preheating a gasolene of 60° Baumé gage is most manifest as the atmospheric temperature falls below 60° F. By investigation of the vapor pressures of such a fuel, it can be taken that at 32° F. the vapor pressure is equivalent to pressure of 50 m. m. of mercury and at 140° F. equivalent to 500 m. m. Since the readiness of the vaporization substantially increases, as the vapor pressures increase, the very great advantage to be gained by preheating the fuel, is quite evident. The relatively low vapor pressures in cold weather of such fuels referred to, clearly indicates why so much trouble is encountered at low atmospheric temperature. While the figures above given are to be taken as examples only, and vary with different gasolenes, still they truly indicate the general advantage of heating the fuel. The vapor pressure of 44° Baumé kerosene at 60° F. may be taken at 22 m. m. of mercury, which very plainly indicates the great difficulty encountered in all attempts to handle this fuel, and shows the advantage to be gained by preheating. From my experience in preheating such fuels, a further material advantage seems to be evident, in that the fuel when discharged from a spray nozzle, appears to be more finely divided, which materially affects the rapidity of vaporization.

I prefer to employ the heat of the exhaust gases instead of the circulating water heat as the preheating medium for the fuel, for many reasons. The heat to assist the vaporization of the fuel is most necessary, when an internal combustion engine and its carbureter or vaporizer are cold or not up to good operating temperature. As the first exhausts contain sufficient heat for the purpose, and as an engine may often be run for half an hour before the circulating water gets above 150° F., it is plain that the exhaust heat is the most efficient source of supply, since it immediately raises the temperature of the fuel.

An important object of my invention is to afford means for automatically controlling the exhaust heat supplied to the heating device, and the advantage of this feature of automatic control resides primarily in the fact that the temperature of the heat chamber is maintained substantially constant and within narrow limits with reference to the variation of temperature of the exhaust gases. Therefore the predetermined temperature of the heat jacket is controlled under varying running conditions and further, on first starting up the engine, and also when the engine is slowed down or idled, a relatively large amount of exhaust gases is automatically utilized. In a fuel preheater without such automatic control, only such supply of exhaust gas could be permitted to pass through the heating chamber of the device as would be safe at full power of the engine, with the attendant high pressure and temperature of such exhaust gases. Consequently such a heating device at starting and low exhaust pressures and temperatures would not have sufficient heat supply and would therefore fail to perform its full function, and would fail when most needed. To manually control such a heat supply would require constant and unremitting care on the part of the operator, and on motor vehicles would be most difficult. On the other hand, a sensitive automatic control of the heating medium continually adjusts the quantity of exhaust gas admitted to the heating chamber, without any attention whatsoever from the operator.

In accordance with my invention, the heating device, which is adapted, among other things, to be connected adjacent the carbureter or vaporizer, is of relatively small dimensions, light in weight, and simple to attach, so that it has the broadest possible utility, especially in motor vehicle and marine installations. The automatic controlling mechanism is of such simplicity as to require practically no attention and to retain indefinitely temperature control setting without material change. The device is so constructed that it may be readily installed in locations difficult of easy access, and it also has the advantage that it may be installed at any angle, or upside down if necessary, without appreciably affecting the automatic control or the temperature setting of the device.

I have illustrated different examples of the invention in the accompanying drawings, in which—

Figure 1 is a longitudinal sectional elevation of one form of the device;

Fig. 2 is a similar view with some of the parts in a different position;

Fig. 3 is a transverse sectional elevation on the line A—A of Fig. 1;

Fig. 4 is a detail broken view, in longitudinal section, of one of the thermostatic members;

Fig. 5 is a detail broken view, partly in vertical section, of one position of the thermostatic members;

Fig. 6 is a horizontal sectional view on a smaller scale, taken on the line B—B of Fig. 3;

Fig. 7 is a transverse sectional elevation similar to Fig. 3 of a modification;

Fig. 8 is a horizontal sectional view on line C—C of Fig. 7;

Fig. 9 is a longitudinal sectional elevation broken away, of the upper portion of a modified form of the device;

Fig. 10 is a view similar to Fig. 9 with some of the parts in a different position;

Figs. 11 and 12 are longitudinal sectional elevations, broken away, of the upper portion of another modification;

Figs. 13, 14 and 15 are similar views of further modifications.

Referring to the drawings, and more particularly to Figs. 1 to 16 inclusive, one suitable form of the device is illustrated, in which D is a suitable casing containing a heating chamber F, preferably having the removable cover 1, adapted to be secured to the casing, as by means of the screws 2 taking into the bosses 3 in the base of the casing.

As shown in this instance, the cover 1 is provided with the inlet port E having an internally screw threaded neck 4 adapted for taking an exhaust gas conduit connection from the exhaust manifold or line of an internal combustion engine, since as hereinbefore stated, I prefer to utilize the exhaust gases as the heating medium. The casing D is also provided with an outlet port K, having the internally screw threaded neck 5, which may take a discharge conduit, so that when the device is properly connected the exhaust gases flow through the heating chamber when both ports are open.

The casing D is preferably made as small and as light as conveniently possible and may be formed of aluminum or other light metal. A liquid fuel conduit 6, forming the fuel chamber, preferably of copper, extends through the casing preferably in a longitudinal direction, affording the heating surface, and is fitted with suitable means, as the screw threaded ends 7, for attachment for instance, in the fuel supply line adjacent the carbureter or vaporizer, so that the liquid fuel flowing through the fuel chamber 6 is subjected to the heat of the exhaust gases in the heat chamber F. The conduit 6 is held firmly in the casing by the jam nuts 8.

In order to automatically control the flow of exhaust gases through the casing, I have shown suitable devices, preferably in the form of sensitive thermostatic members subject to the influence of the heat of the exhaust gases in the heat chamber F and adapted to expand and contract with variations of temperature in said heating chamber. In constructing the thermostatic members, I take advantage of the property of difference in expansion of two metals or alloys, or a metal and an alloy under the influence of applied heat. By constructing such thermostatic members in the form of strips, each composed of metals or alloys having different coefficients of expansion, the tendency of the greater expanding metal or alloy to expand in a straight line, is opposed by the less expanding metal or alloy, thus causing the former to expand and contract in arcs of continually varying radii as the temperature of the applied heat varies. However, the less expanding metal may be made to form the arcs, with the greater expanding metal forming the chords, in which case the less expanding metal would follow arcs of continually varying radii as the temperature of the applied heat varies, due to the material change in length of the chords. In the former case the curvature increases with the increase of temperature and in the latter case decreases with such increase.

The sensitive thermostatic strips 9 may be formed in any desired manner, but I have obtained satisfactory results with strips such as shown in detail in Fig. 4 in which the greater expanding metal G may be brass, having the less expanding nickel-iron alloy H rolled or riveted thereon. This construction materially increases or amplifies the change of the radii of the arcs of circles formed, for the arc may then be considered to be made up of infinitesimal small arcs each with its chord, the length of the arc and the length of the chord being nearly of the same dimension, and therefore the difference of expansion is most manifest. If these thermostatic strips 9 are set straight at normal temperature, say 60° F. such as shown in Fig. 1, then under the influence of greater temperature than 60° F. they bend as illustrated in Fig. 2, and with less temperature than 60° F. they bend in the opposite direction as illustrated in Fig. 5.

I so construct and mount the thermostatic members, that the expansion and contraction is utilized in a most efficient manner for actuating suitable means for controlling the inlet port E. I have shown the inlet port preferably arranged substantially centrally of the cover 1, and a valve 10, preferably in the form of a disk valve, coöperates with the flat valve seat J. By means of this construction, the entering exhaust products impinge directly upon the face of the valve 10 instead of on the sensitive thermostatic members, and are then deflected throughout the heat chamber. The valve also closes quickly against the flat seat J.

The valve spindle or stem 11 slides through a sleeve 12, extending through the bottom of the casing opposite the inlet port E, and this sleeve is preferably made adjustable in any suitable manner, in this instance the sleeve being exteriorly screw threaded and provided with the locking nut 13. A knurled head 14 may be provided for adjusting the sleeve 12.

The thermostatic members or strips 9 as shown in Figs. 1 to 6 are mounted in pairs on the stem 11, which passes loosely through apertures in the strips, preferably substantially at their center. A washer 15 separates the pairs, and washers 16 and 17 are preferably placed respectively underneath the head of the valve and between one pair of strips and the end of the sleeve 12. The washer 16 under the head of the valve prevents the heated valve from contacting with the strips.

The outer end of the valve stem 11, outside of the casing, as shown, is preferably provided with a spring 18 which may be in the form of a coiled spring placed over the end of the stem and confined between the sleeve 12 and the washer 19 held by the pin 20. Said spring 18 holds the valve and thermostatic members snugly together and permits the installation of the device at any angle.

Suitable means are preferably provided in the casing for guiding the strips 9 and for preventing them from getting out of alinement, and I have provided guide ribs 21 at one end of the casing, between which the ends of the strips 9 lie.

In Figs. 1 to 6 inclusive, the pairs of strips 9 are arranged face to face with the brass or greater expanding metal G outward, and the alloy faces H inward. Fig. 1 shows the thermostatic members in normal position at a temperature of about 60° F. with the valve 10 fully open. Fig. 2 shows the strips 9 in bowed or arched position under the influence of higher temperature with the valve 10 nearly closed. Fig. 5 shows the strips 9 in the form they would assume under a temperature lower than normal, which would cause the ends to curl backwardly as indicated. As a thermostat may be a device for controlling the temperature of a heat chamber, it is evident that these thermostatic members or strips 9 and the valve 10 constitute a thermostat in this invention, or a thermostatic control. Where the valve is omitted, as in Figs. 11 and 12, the strips alone constitute the thermostat.

Figs. 7 and 8 show a device like that already described, except that the device is provided with a fuel chamber consisting of the conduit 6$^a$, a return bend 22, and a return conduit 23 through the casing, thus exposing a greater length of conduit to the heat of the exhaust gases, thereby increasing the heating surface. Any suitable or desirable arrangement of the fuel chamber may be provided, exposing such surface to the exhaust gases as necessary for the transmission of the heat to the fuel, and it may be cast integral with the casing.

In the operation of the device, the thermostatic control is set to maintain a given predetermined temperature in the heat chamber, and as the operation of the engine varies, thereby varying the temperature and pressure of the exhaust gases, the thermostatic members 9 automatically raise the valve 10 immediately the temperature rises, and lower said valve 10 immediately the temperature falls below the temperature setting, thereby automatically controlling the quantity of exhaust gas admitted according to the temperature in the heating chamber. As the quantity of such gas is extremely large compared to the quantity of fuel being used by the engine, it is only necessary to provide proper heating surface to consistently raise the temperature of the fuel to a predetermined temperature with reference to the temperature of the heat chamber. Therefore the thermostatic control may be set either for a predetermined temperature of the heat chamber or a predetermined temperature of the fuel.

The fuel chamber I prefer in conduit form as it affords the maximum heating surface for the fuel contained, and is absolutely liquid tight and enables simple, strong and tight fuel connections, not subject to the heat of the heat chamber.

The plurality of thermostatic members 9 are advantageous in providing relative large movement of the valve 10, it being evident at starting, that the exhaust gases should not be restricted, as they are of much lower temperature than under average running conditions. The adjustment of the thermostatic control embodied in the sleeve 12 is not absolutely necessary, because in manufacture the correct setting of the thermostatic strips may be made for maintaining the predetermined temperature, or other forms of adjustment may be provided. However, this adjustment is very valuable for certain uses of the invention.

In Figs. 9 and 10 a modification of the device is shown in which only one sensitive thermostatic member or strip 9$^b$ is shown in the casing D$^2$, having its ends loosely supported on the lugs or brackets 24 on the ends of the casing. The valve 10$^b$ is carried centrally by the strip 9$^b$ in any suitable manner. As shown the valve stem 25 passes through an aperture in the strip and washers 16$^b$ and 26 are placed on each side of the strip. A pin 27 or other fastening device holds the stem 25 to the strip. Fig. 9 shows the strip 9$^b$ under the influence of material heat with the valve 10$^b$ nearly closed and Fig. 10 shows the strip 9$^b$ bowed or curved in the opposite manner under material cold.

Figs. 11 and 12 illustrate a device similar to that shown in Fig. 9 except that the valve 10$^b$ is omitted and the inlet port E$^3$ has a depending lip 28 forming a valve seat against which the thermostatic strip 9$^c$ itself abuts under the influence of excess heat, to close the inlet port as shown in Fig. 11. The normal position of 9$^c$ is indicated in Fig. 12. Further, 9$^c$ is adjustable by the supporting bolts 39 held by the nut 40 and is kept in place by the spring 41.

In Figs. 13, 14 and 15, modifications are shown in which the thermostatic members or strips are each unitary and formed of a single metal instead of compound metals. In this instance, the strip G$^4$ is formed of high expanding metal as brass, and the valve 10$^d$ is connected to this strip, as in Fig. 9. The strip H$^4$ forming a tie member is composed of alloy, as a nickel-iron alloy, and its ends rest upon the brackets 29, and are hooked or bent to form abutments 30 for the ends of the brass strip G$^4$, so that under the influence of heat, the greater expanding strip G$^4$ will arch or expand toward the cover 1$^d$ and close the valve 10$^d$ against its seat J$^4$.

As another modification, the alloy strip or tie member H$^4$ may be omitted and the ends of the brass strip G$^4$ may abut directly against the walls of the casing, in which case the casing should preferably be formed of cast iron instead of aluminum, as it expands less.

In Fig. 14 the two curved strips G$^5$ of brass are held or secured by the abutments 31 and 32 formed by bending the ends of the central tie member or strip H$^5$ of alloy, and the members so tied together are supported on the support 33 in the casing D$^5$. The ends of the thermostatic members are guided by the guide flanges 34 and 35 and the valve 10ᵉ is suitably mounted on the strip G⁵ which is opposite the inlet port E⁵. Under the influence of heat the members G⁵ tend to expand and force the valve 10ᵉ against its seat.

In Fig. 15 a modification of the device shown in Fig. 14 is illustrated having a plurality of thermostatic couples constructed like Fig. 14. In this case the couples are supported one on top of the other upon the support 36 extending across the casing D⁶ and the valve stem 11 of the valve 10ᶠ extends loosely through all the strips as shown. The ends of the strips are guided by the guide flanges 37 and 38 and as the high expanding brass strips G⁶ expand, the valve closes against its seat.

Obviously other modifications of the device could be devised and in my copending application Serial No. 863,375, filed September 24, 1914, I have disclosed some further modifications embodying the principles of this invention.

I claim and desire to obtain by Letters Patent the following:

1. A device for heating liquid fuel, comprising a casing having inlet and outlet ports to permit the flow of a gaseous heating medium through the casing, a liquid fuel chamber in the casing with inlet and outlet means, and independent automatic means in the said casing actuated by the heat of the said heating medium in the said casing for regulating the temperature of the liquid fuel.

2. A device for heating liquid fuel, comprising a casing having inlet and outlet ports to permit the flow of a gaseous heating medium through the casing, a liquid fuel chamber in the casing, with inlet and outlet means, a valve for the said inlet port in the casing, and independent actuating means in the said casing for said valve, automatically actuated by the heat of the said heating medium for regulating the temperature within the said casing.

3. A device for heating liquid fuel, comprising a casing having inlet and outlet ports to permit the flow of exhaust gases through the casing, a liquid fuel chamber in the casing with inlet and outlet means, and independent thermostatic means in the said exhaust gas casing for controlling said inlet port in the casing, automatically actuated by the heat of the exhaust gases in the exhaust gas casing.

4. A device for heating liquid fuel, comprising a casing having inlet and outlet ports to permit the flow of exhaust gases through the casing, a liquid fuel chamber in the casing with inlet and outlet means, thermostatic means in the casing for controlling said inlet port in the casing, automatically actuated by the heat of the exhaust gases in the exhaust gas casing, and supporting devices for the thermostatic means affording provision for setting said casing at any angle or position whatsoever, without interfering with the automatic operation of the device.

5. A device for heating liquid fuel, comprising a casing having inlet and outlet ports to permit the flow of exhaust gases through the casing, a liquid fuel chamber in the casing with inlet and outlet means, a valve for the said inlet port in the casing and thermostatic members in the casing connected to actuate the valve and composed of metals having different coefficients of expansion.

6. A device for heating liquid fuel, comprising a casing having inlet and outlet ports to permit the flow of exhaust gases through the casing, a liquid fuel chamber in the casing with inlet and outlet means, a disk valve in the casing movable to and from the said inlet port, whereby the exhaust gases impinge directly upon the valve, and thermostatic members in the casing connected to directly actuate the valve and composed of metals having different coefficients of expansion.

7. A device for heating liquid fuel, comprising a casing having inlet and outlet ports, a fuel conduit in the casing for subjecting the liquid fuel to the heat of a gaseous heating medium, thermostatic members formed of metallic strips supported in said casing, and subject to the heat of the heating medium, and a valve for the inlet port connected to be actuated by said strips, whereby the temperature of the liquid fuel passing through the fuel conduit in the casing is regulated.

8. A device for heating liquid fuel, comprising a casing having inlet and outlet ports to permit the flow of a gaseous heating medium through the casing, a liquid fuel conduit passing through the casing, a thermostat comprising bi-metallic strips centrally supported in said casing and a valve adapted to close and open said inlet port in accordance with the expansion and contraction of said strips.

9. A device for heating liquid fuel, comprising a casing having inlet and outlet ports to permit the flow of a gaseous heating medium through the casing, a liquid fuel conduit in the casing, thermostatic members formed of bi-metallic strips centrally supported in said casing, a valve adapted to close and open said inlet port in accordance with the expansion and contraction of said strips, additional means for aiding in maintaining the thermostatic members in position, and means for adjusting the normal position of the valve relative to the valve seat of the said inlet port.

10. A device for heating liquid fuel, comprising a casing having inlet and outlet ports to permit the flow of exhaust gases through the casing, a liquid fuel conduit in the casing, and a thermostat comprising a bi-metallic strip in said casing, adapted to close and open said inlet port in accordance with the expansion and contraction of said strip.

11. A device for heating liquid fuel, comprising a casing having inlet and outlet ports to permit the flow of a gaseous heating medium through the casing, a liquid fuel chamber in the casing, a longitudinally movable spindle extending into the casing opposite the inlet port, thermostatic members in the form of metallic strips, each composed of a plurality of different metals and supported on said spindle, and a valve for the inlet port carried by the spindle and adapted to be moved to and from the inlet port by the expansion and contraction of said thermostatic members due to variations of heat in said casing.

12. A device for heating liquid fuel, comprising a casing having inlet and outlet ports to permit the flow of a gaseous heating medium through the casing, a liquid fuel conduit in the casing, a sleeve extending through the casing opposite the said inlet port, a spindle movable longitudinally in said sleeve, a valve carried by the inner end of the spindle, and thermostatic members in the form of metallic strips of different metals loosely supported on said spindle between the valve and the sleeve, and adapted to move to close and open the inlet port by the expansion and contraction of said thermostatic members due to variations of temperature in said casing.

13. A device for heating liquid fuel, comprising a casing having inlet and outlet ports to permit the flow of a gaseous heating medium through the casing, a liquid fuel conduit in the casing, an adjustable sleeve extending through the casing opposite the said inlet port, a spindle movable longitudinally in said sleeve, a valve carried by the inner end of the spindle, thermostatic members in the form of metallic strips of different metals loosely supported on said spindle between the valve and the sleeve, and adapted to move to close and open the inlet port by the expansion and contraction of said thermostatic members, due to variations of temperature in said casing, and a spring for said spindle outside of the casing for maintaining the valve and thermostatic members in position irrespective of the angle of installation of the device.

In testimony whereof I have signed this specification in the presence of two subscribing witnesses.

HENRY NEWTON WHITTELSEY.

Witnesses:
 THOMAS HOWE,
 M. M. RIEMANN.